(12) United States Patent
Paik et al.

(10) Patent No.: US 8,526,722 B2
(45) Date of Patent: Sep. 3, 2013

(54) APPARATUS AND METHOD FOR ENHANCING IMAGE QUALITY OF IMAGE CAPTURED BY USING MULTIPLE COLOR-FILTER APERTURE

(75) Inventors: Joon-Ki Paik, Seoul (KR); Eun-Sung Lee, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 199 days.

(21) Appl. No.: 13/088,070

(22) Filed: Apr. 15, 2011

(65) Prior Publication Data

US 2012/0093399 A1 Apr. 19, 2012

(30) Foreign Application Priority Data

Oct. 16, 2010 (KR) ........................ 10-2010-0101016

(51) Int. Cl.
*G06K 9/00* (2006.01)
(52) U.S. Cl.
USPC .......................................................... 382/164
(58) Field of Classification Search
USPC ................. 382/100, 164, 254–255, 263–264, 382/274–275; 396/89, 459; 348/270, 273, 348/345
See application file for complete search history.

(56) References Cited

U.S. PATENT DOCUMENTS 8,228,417 B1 * 7/2012 Georgiev et al. .............. 348/340

OTHER PUBLICATIONS

Jinhee Lee, Eunsung Lee, Vivek Maik, Joonki Paik, Automatic color channel registration for multiple color-filtered aperture camera, 2010 The 22nd Workshop on Image Processing and Understanding, Jan. 27, 2010, The Korean Society of Broadcast Engineers, Jejudo Republic of Korea.
Vivek Maik, Dohee Cho, Jeogho Shin, Donghwan Har, Joonki Paik, Color Shift Model-Based Segmentation and Fusion for Digital Autofocusing, Journal of Imaging Science and Technology, Jul./Aug. 2007, 368-379, vol. 51, Issue No. 4.
Vivek Maik, Dohee Cho, Sangjin Kim, Donghwan Har, Joonki Paik, Computational Filter-Aperture Approach for Single-View Multi-Focusing, 16th Institute of Electrical and Electronics Engineers (IEEE) International Conference on Image Processing (ICIP), Nov. 7-9, 2009, pp. 1541-1544, IEEE.

* cited by examiner

*Primary Examiner* — Jose Couso
(74) *Attorney, Agent, or Firm* — William Park & Associates Patent Ltd.

(57) ABSTRACT

Provided are an apparatus and method for enhancing image quality of an input image captured by an image capturing device having an aperture with a plurality of openings employing different color filters. The image quality enhancing apparatus includes an ROI (region of interest) classifying unit classifying ROIs according to distances from the image capturing device of a captured input image by using a cluster-based image segmentation algorithm, a color channel registering unit determining motion vectors of color channels corresponding to the respective ROIs by analyzing a high frequency component of image data included in the ROIs, and moving the color channels based on the determined motion vectors to obtain a registered image of the respective ROIs, and an image fusing unit fusing the registered images of the respective ROIs to obtain a fused image.

11 Claims, 10 Drawing Sheets
(6 of 10 Drawing Sheet(s) Filed in Color)

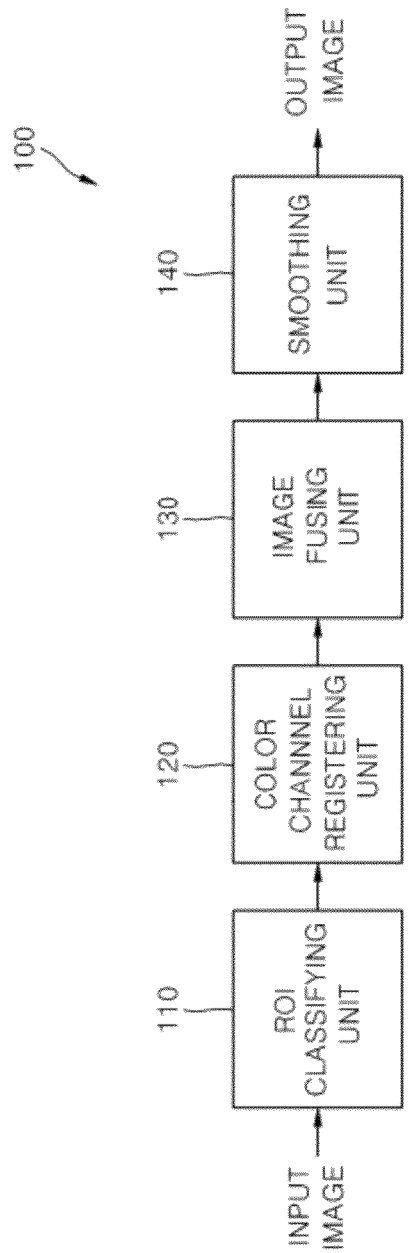

(a)                  (b)

APPARATUS AND METHOD FOR ENHANCING IMAGE QUALITY OF IMAGE CAPTURED BY USING MULTIPLE COLOR-FILTER APERTURE

CROSS-REFERENCE TO RELATED APPLICATION

This application claims priority to Korean Patent Application No. 10-2010-0101016 filed on Oct. 15, 2010 and all the benefits accruing therefrom under 35 U.S.C. §119, the contents of which are incorporated by reference in their entirety.

BACKGROUND

The present disclosure relates to an apparatus and method for enhancing image quality of an input image captured by an image capturing device such as a camcorder or a camera, and more particularly, to an apparatus and method for enhancing image quality of an input image, which has been captured by using a multiple color-filter aperture (MCA) camera based on a digital multi-focusing color shift model, by using a cluster-based image segmentation algorithm.

A digital auto-focusing technique has increasingly come to prominence in various applications, such as super-resolution, video surveillance, and image signal processing chain in a digital camera, and the like. However, most auto-focusing techniques require intensive computational overhead such as point spread function (PSF) estimation, digital image restoration, post-processing for suppressing amplified noise, or the like.

Recently, an increase in the resolution and precision of image devices brings about making a focal point of an image blurry due to a fine shift of an object or an image capturing device in capturing an image of the object. In particular, when a plurality of objects located at different distances from a lens exist, the focuses of the objects, except the object located at the focal distance, are not precisely adjusted, causing blurs. Thus, the necessity of an auto-focusing technique for restoring the images out of focus is increasing.

The related arts for an auto-focusing generally include two modules: an analysis module and a control module. The analysis module estimates a focus degree of an image on the plane of the image, and the control module serves to move a lens assembly to an optical focus position based on the focus degree information estimated by the analysis module to adjust the focus. The systems employing the auto-focusing technique include an infrared auto-focusing (IRAF) system, a TTL (through-the-lens auto-focusing (TTLAF) system, a semi-digital auto-focusing (SDAF) system, and a fully digital auto-focusing (FDAF) system. The IRAF scheme uses infrared rays, the TTLAF scheme uses a phase difference of an input image, and the SDAF scheme uses a high frequency of an input image to estimate the depth of field. The FDAF scheme generally includes a digital image restoration and fusion process to obtain an image in focus. In terms of the precision, the FIRAF scheme has good precision, and the TTLAF scheme can obtain very high quality factor when good conditions are met. Meanwhile, the SDAF and the FDAF schemes have a less precision than that of the FIRAF and TTLAF schemes.

The FDAF scheme has a limitation related to a digital image restoration. When objects of the depths of fields are restored, a reblurring or ringing phenomenon may occur at the focus regions, and the depths of fields may be lowered. For the same depths of fields, there is a remarkable limitation in the image quality of the restored image due to the image restoration. Also, much time is required to obtain a fully restored image due to the repeated restoration process.

Thus, a technique for performing autofocusing function at a high speed by reducing the amount of calculation for autofocusing and reliably adjusting the focus of all the objects existing at different locations even in a multi-focus image is required.

SUMMARY

The present disclosure provides an apparatus and method for enhancing image quality of a multi-focus image in which various objects located at a different distances are all focused.

The present disclosure also provides a computer-readable recording medium having a program for executing a method for enhancing image quality of a multi-focus image in which various objects located at a different distances are all focused in a computer.

According to an exemplary embodiment, an apparatus for enhancing image quality of an image includes: an ROI (region of interest) classifying unit classifying ROIs according to distances from an image capturing device with respect to the entire area of an input image captured by the image capturing device having an aperture with a plurality of openings employing different color filters by using a cluster-based image segmentation algorithm; a color channel registering unit determining motion vectors of color channels corresponding to the respective ROIs by analyzing a high frequency component of image data included in the ROIs, and moving the color channels based on the determined motion vectors to obtain a registered image of the respective ROIs; and an image fusing unit fusing the registered images of the respective ROIs to obtain a fused image.

According to another exemplary embodiment, a method for enhancing image quality of an image includes: an ROI (region of interest) classifying step of classifying ROIs according to distances from an image capturing device in an input image captured by the image capturing device having an aperture with a plurality of openings employing different color filters by using a cluster-based image segmentation algorithm; a color channel registering step of determining motion vectors of color channels corresponding to the respective ROIs by analyzing a high frequency component of image data included in the ROIs, and moving the color channels based on the determined motion vectors to obtain a registered image of the respective ROIs; and an image fusing step of fusing the registered images of the respective ROIs to obtain a fused image.

BRIEF DESCRIPTION OF THE DRAWINGS

The patent or application file contains at least one drawing executed in color. Copies of this patent or patent publication with color drawing(s) will be provided by the Office upon request and payment of the necessary fee. Exemplary embodiments can be understood in more detail from the following description taken in conjunction with the accompanying drawings, in which:

FIG. 1 is a block diagram showing the configuration of an image quality enhancing apparatus according to an exemplary embodiment;

DETAILED DESCRIPTION OF EMBODIMENTS

Figure 2A:
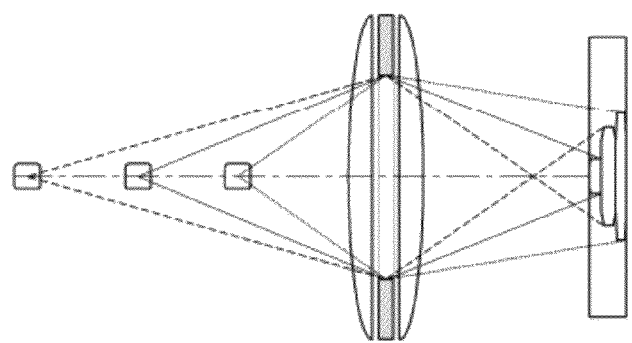
FIGS. 2A to 2C are views for explaining images formed by using an aperture with a single opening and multiple openings.

Hereinafter, an apparatus and method for enhancing image quality of an image according to exemplary embodiments will be described with reference to the accompanying drawings. Throughout the specification and claims, unless explicitly described to the contrary, the word "comprise" and variations such as "comprises" or "comprising", will be understood to imply the inclusion of stated elements but not the exclusion of any other elements. Terms such as 'unit', 'module', 'block', or the like, described in the specification may refer to a unit for processing at least one function or operation, which can be implemented by hardware, software, or a combination of hardware and software.

FIG. 1 is a block diagram showing the configuration of an image quality enhancing apparatus according to an exemplary embodiment.

With reference to FIG. 1, an image quality enhancing apparatus 100 according to an exemplary embodiment includes an ROI (region of interest) classifying unit 110, a color channel registering unit 120, an image fusing unit 130, and a smoothing unit 140.

The ROI classifying unit 110 classifies ROIs, in which color channels are to be registered, by using a cluster-based image segmentation scheme. The color channel registering unit 120 registers color channels of the respective ROIs to generate registered images. In this case, the color channel registering unit 120 estimates an optimum point spread function (PSF) by performing phase correlation matching (PCM) on each of the classified regions. The generated registered images are provided to the image fusing unit 130, and the image fusing unit 130 fuses the registered ROIs to generate a multi-focal fused image. The smoothing unit 140 divides the image into a high frequency region and a low frequency region by using a spatially adaptive noise smoothing algorithm based on an alpha map in order to further enhance image quality of the restored and fused image.

A multi-color-filter camera for capturing an input image input to the image quality enhancing apparatus according to an exemplary embodiment will now be described to help understand the present disclosure.

Figure 2B:
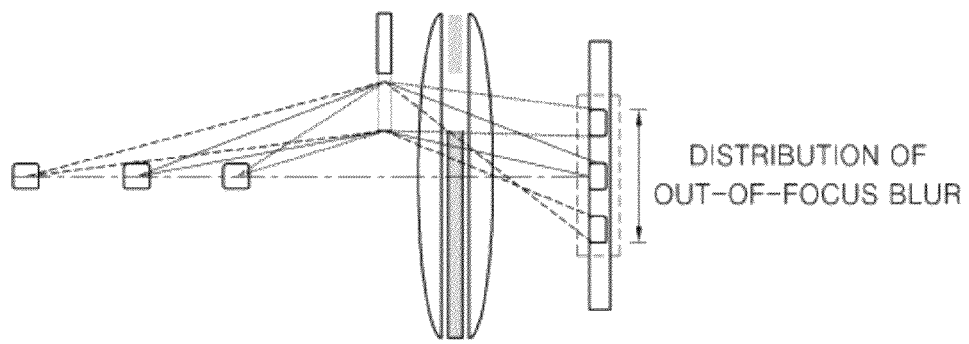
Figure 2C:
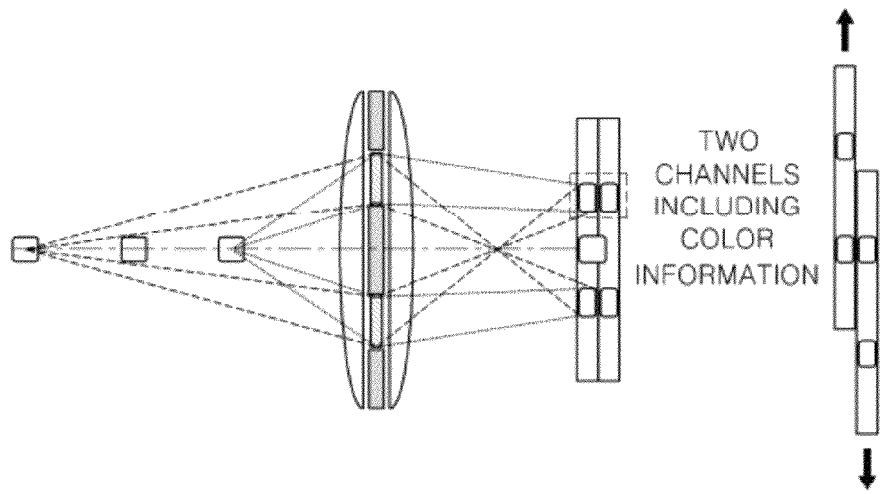

FIGS. 2A to 2C are views for explaining images formed by using an aperture with a single opening and multiple openings.

With reference to FIGS. 2A to 2C, an aperture of an optical system is an opening device for adjusting the amount of incident light. As shown in FIG. 2A, the opening of the aperture of a general camera is aligned to an optical axis of a lens, and a convergence pattern on an image plane forms a point or a circular region according to the distance of an object. Meanwhile, if the opening of the aperture is not aligned to the optical axis, the converged region is deviated from the optical axis as shown in FIG. 2B. A specific region to which light is collected differs according to the distance between the lens and the object. For example, an object closer than a focal position is converted to an upper side of the optical axis, and an object farther than the focal position is converted to a lower side of the focal position. A focal pattern of an image can be generated based on the amount of such offsets from the optical axis. FIG. 2C illustrates a case of using an aperture with two openings on either side of the optical axis. It can be noted that a convergence pattern of the far-focused object lies on the opposite side in the imaging sensor.

FIGS. 3A to 3D are views for explaining images formed by using an aperture with three openings.

Figure 3A:
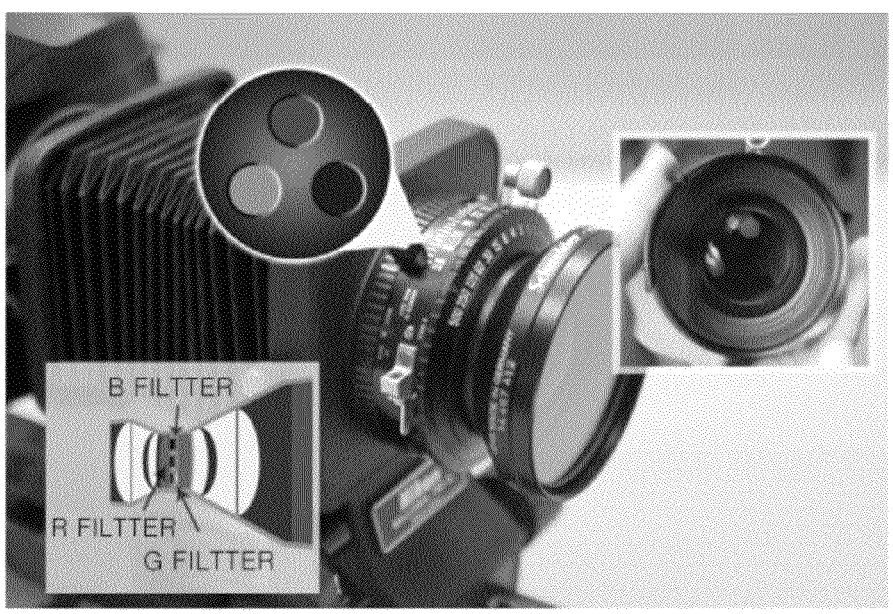
FIGS. 3A to 3D are views for explaining images formed by using an aperture with three openings.
Figure 3B:
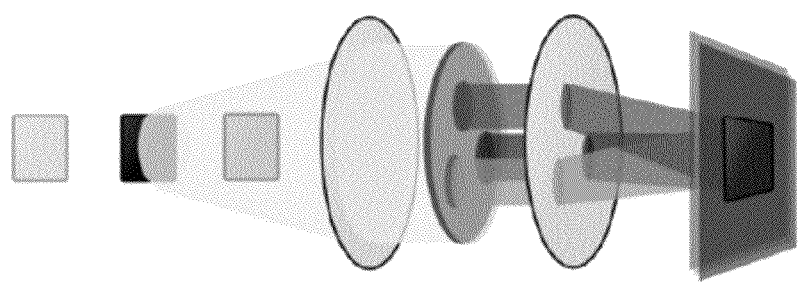
Figure 3C:
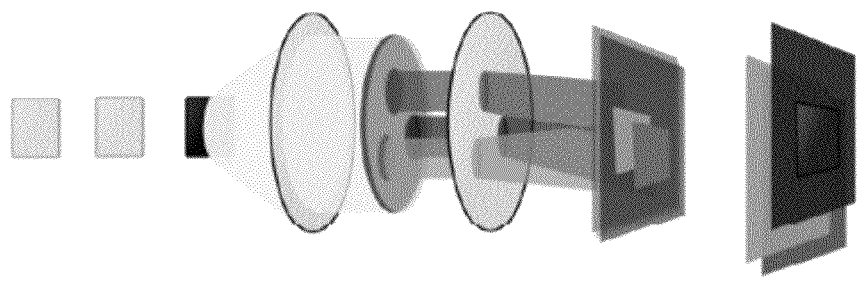
Figure 3D:
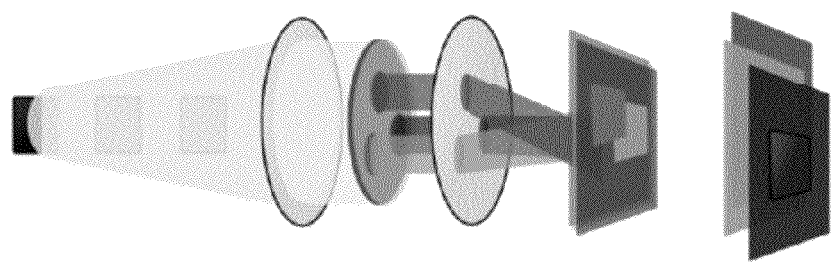
Figure 4:
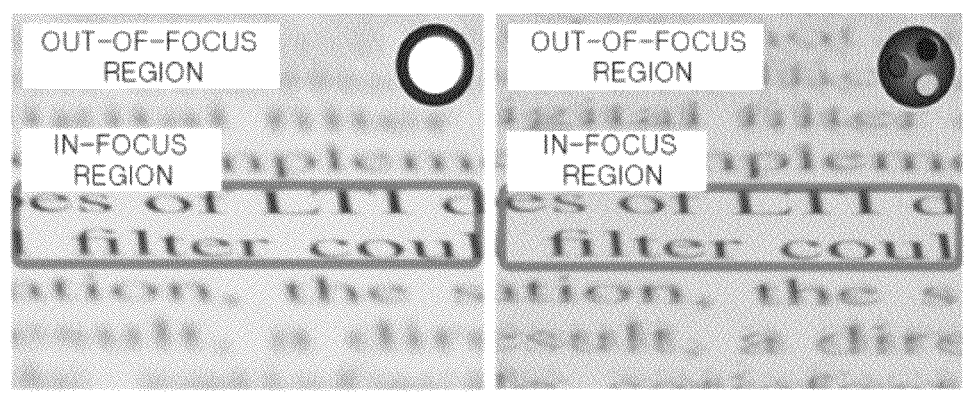
FIG. 4 is a view for explaining a process of generating an out-of-focus blur in a general camera and in an MCA camera system.

As shown in FIG. 3A, a multi-color-filter aperture (MCA) camera uses three openings with R, G, and B filters. With reference to FIGS. 3B to 3D, a main advantage of the MCA camera is that it provides additional depth information which can be estimated from the direction and amount of color deviation from the optical axis. When an object is located on the out-focused position, the MCA camera results in out-of-focus blur as well as color shifting. FIG. 4 is a view for explaining a process of generating an out-of-focus blur in a general camera and in an MCA camera system. FIG. 4(a) shows an out-of-focus blur generated in a general camera, and FIG. 4(b) shows a color misalignment pattern generated in the MCA system.

The image quality enhancing apparatus 100 according to an exemplary embodiment classifies ROIs by using a cluster-based image segmentation scheme and analyzes a high frequency component of each ROI, in order to register color misalignment. And, the image quality enhancing apparatus 100 fuses the registered regions to generate a complete multi-focus image. In addition, the image quality enhancing apparatus 100 according to an exemplary embodiment uses a spatially adaptive noise smoothing algorithm in order to further enhance image quality of the restored and fused image.

The image captured by the MCA camera includes color channels which have been moved to a degree, and since the color channels are moved, an out-of-point blur with respect to objects located at different distances occurs. In an image registration and fusion algorithm based on a color shift model proposed by the present embodiment, color channels are aligned in a space-variant manner according to the depth of objects by using the ROIs and the PCM scheme. Space-adaptively aligned image regions are finally fused to obtain a full in-focus image. A main advantage of the present embodiment is that automatic registration can be performed without hand-tuning of parameters.

The operation of the ROI classifying unit 110 using a cluster-based image segmentation will now be described in detail.

In order to register color misalignment, the ROI classifying unit 110 uses a cluster-based image segmentation algorithm for an ROI classification. In this case, a K-means clustering scheme and a block partitioning scheme are adopted to search for regions to be registered and fused.

The K-means clustering algorithm starts from selecting K seeds from an input data set. The K seeds are automatically determined by using a hill-climbing scheme in a three-dimensional (3D) CIELab histogram of an image. As an input RGB color space is converted into a CIELab color space through the K-means clustering algorithm, a corresponding 3D CIELab histogram is generated. In the hill-climbing algorithm, a bin is selected and a peak of the corresponding bin is searched. This process is repeated until all bins are climbed. Identified peaks form the number of initial seeds for adopting the K-means clustering algorithm. More specifically, in the hill-climbing algorithm, peaks of the bins are searched from an N-dimensional histogram space.

Figure 5:
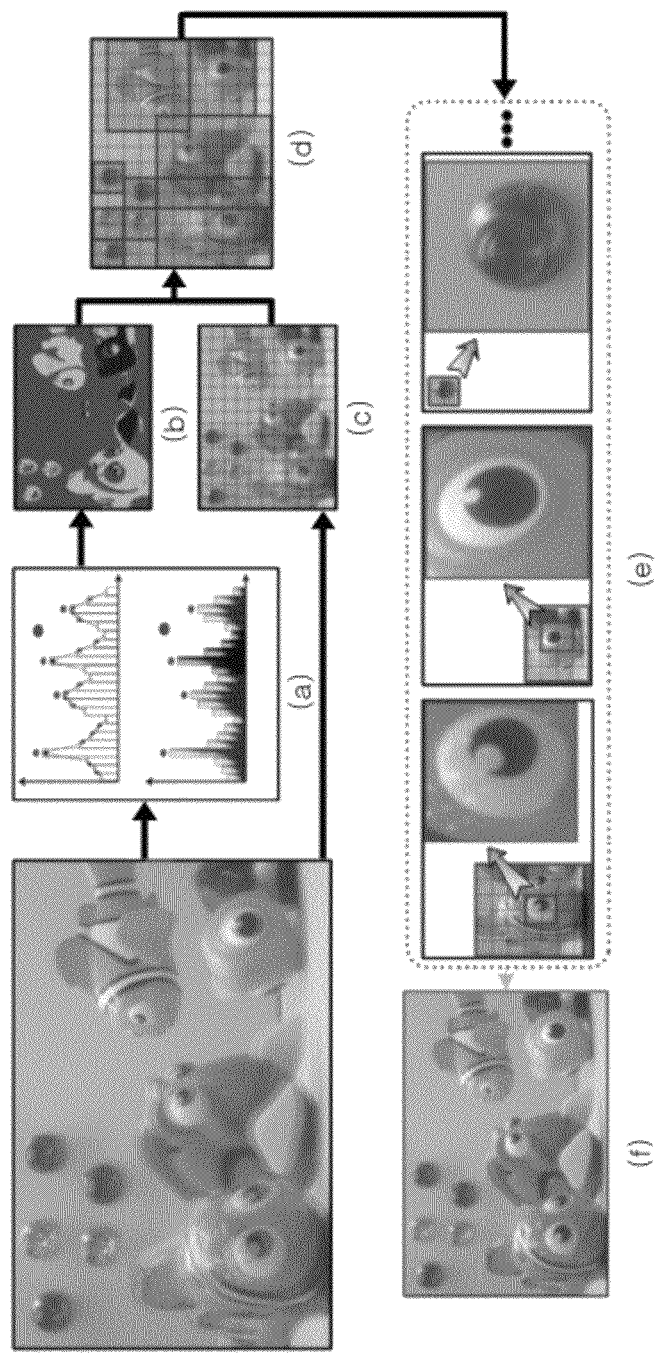
FIG. 5 is a view for explaining the process of improving image quality by employing a present embodiment in a one-dimensional case.

FIG. 5 is a view for explaining the process of improving image quality by employing the present embodiment in a one-dimensional case. In FIG. 5, (a) shows a performing process of the hill-climbing algorithm, (b) shows a salient region, (c) shows a block partitioning operation, (d) shows new ROIs obtained by an exemplary embodiment, (e) shows registered regions, and (f) shows a fused image.

With reference to FIG. 5, the hill-climbing algorithm is performed on a one-dimensional case as shown in FIG. 5(a). The K-means algorithm minimizes data distribution from the center obtained by Equation 1 shown below:

$$V = \sum_{i=1}^{K} \sum_{j \in S_i} \|x_j - c_i\|^2 \qquad \text{Equation 1}$$

Here, K is the number of seeds, $S_i$ is a region of ith seed, $x_j = [L_j, a_j, b_j]^T$ is a data set, and $c_i$ is the center of $x_j \in S_i$. The sum of square errors (V) is a central distance from the data set, and also indicates the position of a next center. The cluster algorithm classifies salient regions according to individual objects.

Figure 6:
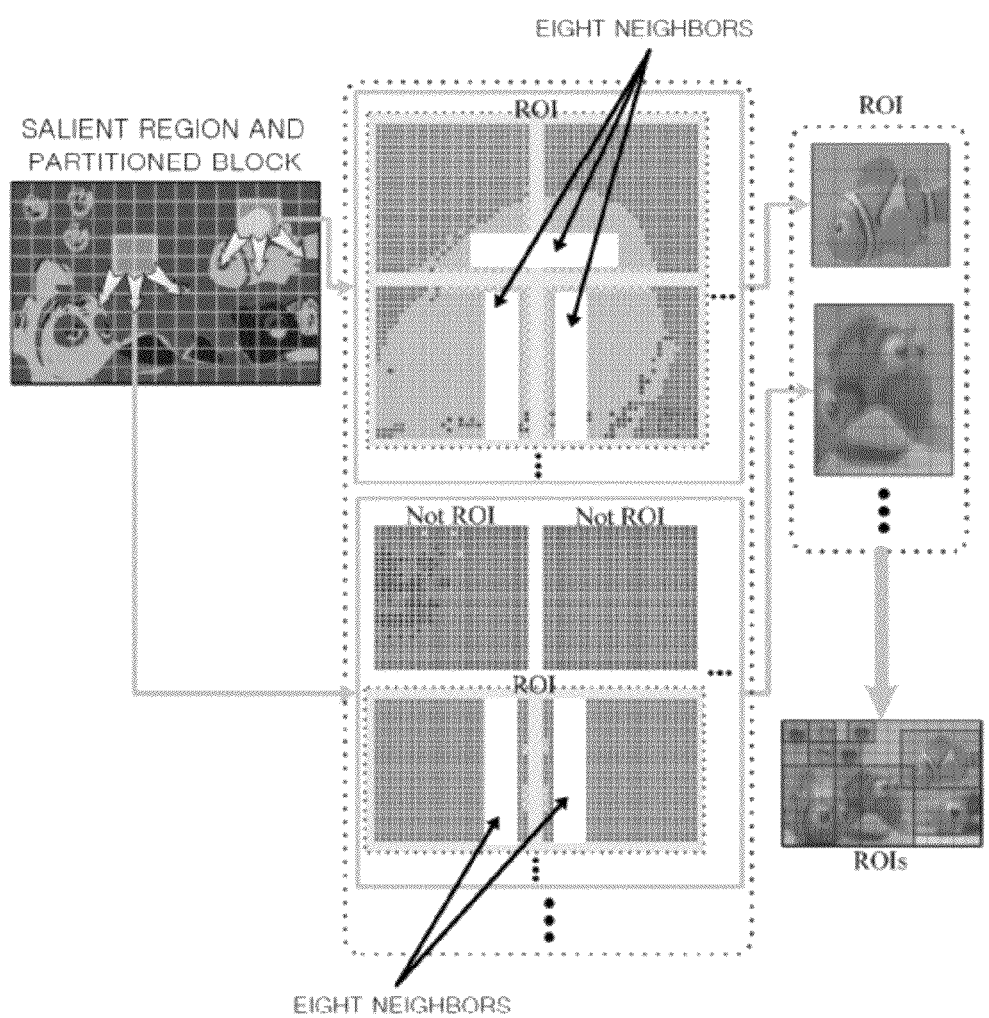
FIG. 6 is a view illustrating the process of classifying ROIs performed by the image quality enhancing apparatus according to an exemplary embodiment.

FIG. 6 is a view illustrating the process of classifying ROIs performed by the image quality enhancing apparatus according to an exemplary embodiment. In this case, a CIELab histogram having a bin size of 16×16×16 is used and labeling with eight neighbors connected in each cluster is performed for the sake of brevity. However, this is for the sake of understanding and the present embodiment is not limited thereto.

With reference to FIG. 6, after salient regions are labeled, the input image is partitioned into blocks each having the same size as shown in FIG. 5(c). The block partitioning process merges regions which have not been selected by the clustering algorithm. The partitioned blocks generate a map of ROIs for color shifting with the K-means clustering.

The ROI classifying unit 110 selects a reference block including clusters in order to classify ROIs. If adjacent blocks include the clusters of the reference block and if pixels are connected between the adjacent blocks and the reference block, a new ROI is merged to a previous ROI. As shown in FIG. 6, this process is repeatedly performed to determine an ROI of each object. The ROI of each object consists of the lowest position and the highest position of the selected blocks. Finally, the ROIs classify the image as shown in FIG. 5(d) and FIG. 6.

Hereinafter, the operation of the color channel registering unit 120 included in the image quality enhancing apparatus according to an exemplary embodiment will now be described.

The color channel registering unit 120 registers and fuses ROIs in order to obtain a fully multi-focused image. First, in order to perform registration, the color channel registering unit 120 aligns ROIs of R and B channels with an ROI of a reference G channel. Each color shifting information in blocks of the ROIs can be differently expressed by displacements (Δx, Δy) as shown in Equation 2 below:

$$f_G(x,y) = f_c(x - \Delta x_c, y - \Delta y_c), \text{ for } c \in \{R, B\} \qquad \text{Equation 2}$$

Here, f is a certain color channel.

A corresponding 2-dimensional (2D) discrete Fourier transform (DFT) is given as shown in Equation 3 below:

$$F_G(u,v) = \exp\{-j2\pi(u\Delta x + v\Delta y)\} F_{R \text{ or } B}(u,v) \qquad \text{Equation 3}$$

The amount of color shifting is estimated by matching a phase transition to a high frequency component as shown in Equation 4 below:

$$R_d(u,v) = \frac{F_G F^*_{R \text{ or } B}}{|F_G F^*_{R \text{ or } B}|} = \exp\{-j2\pi(u\Delta x + v\Delta y)\} \qquad \text{Equation 4}$$

Here, $R_d(u,v)$ is a cross-power spectrum, and $F^*_i$ is a complex conjugate of $F_i$ (i ∈ {R, G, B}).

The inverse 2D DFT gives information regarding a color shifting among color channels as shown in Equation 5 shown below.

$$r_d(x,y) = \delta(x - \Delta x, y - \Delta y) \qquad \text{Equation 5}$$

The ROI and the PCM scheme proposed by the embodiment effectively matches the objects as shown in FIG. 5(e). The color-shifted objects are fused to form a multi-focus image.

Figure 7:
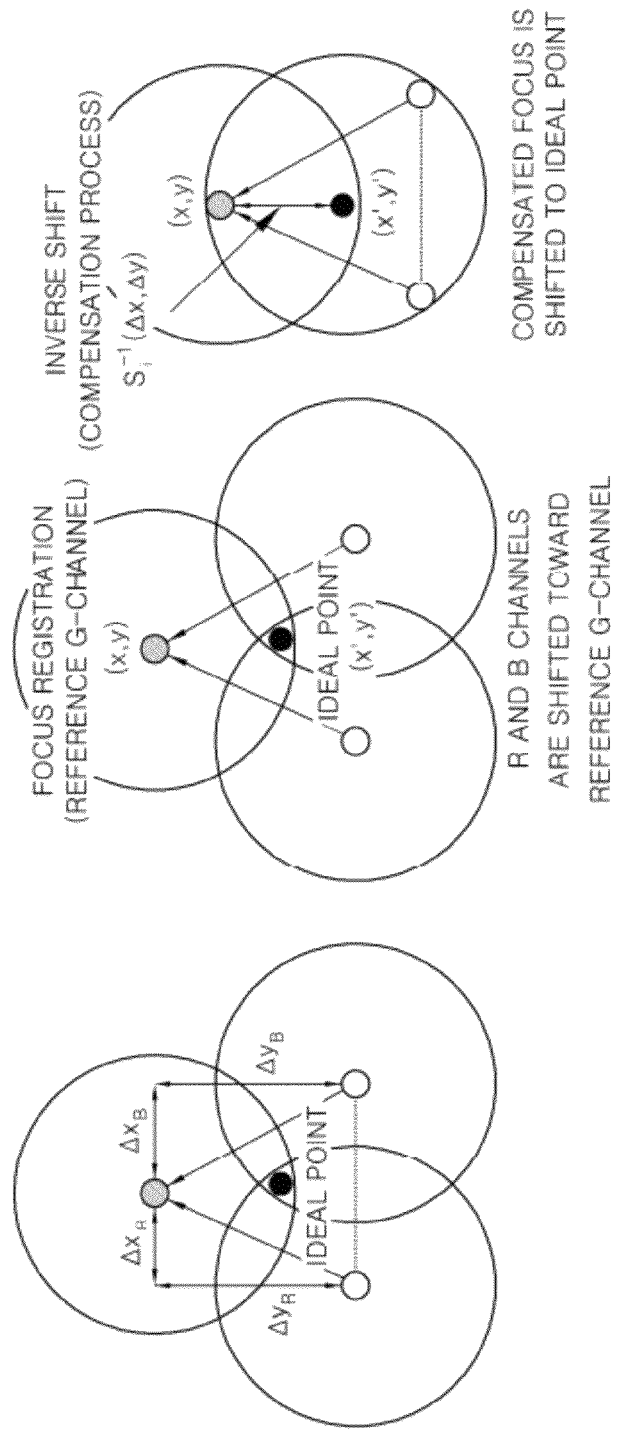
FIG. 7 is a view for explaining a process of compensating for motion vectors.

FIG. 7 is a view for explaining a process of compensating for motion vectors.

The MCA camera includes particular information regarding a color shifting providing depth information of a object according to the distance from the camera to the object, and in this case, the information is obtained by using the aperture having R, G, and B color filters positioned at three vertexes of an equilateral triangle. An ideal focus with respect to the color shifting information according to the distance of the object is the center of gravity of the R, G, and B color-filtered aperture as shown in FIG. 7. Although the center of gravity is an ideal focus, the R and B channels are aligned to the reference G channel in order to simplify calculation. Then, an additional compensation operation as shown in Equation 6 below is required.

$$I'_i(x',y') = I_i(x,y) - S_i^{-1}(\Delta x, \Delta y) \qquad \text{Equation 6}$$

Here, $I_i(x, y)$ is a color shifting region, $S_i^{-1}$ is a compensation vector of the shifted region, and $I'_i(x', y')$ is a compensated region.

When a shifting compensation process is performed on each ROI of the clustered image, some pixels are missing in an image fusion process. Thus, the missing pixels must be replaced by pixels of one of available shifted images.

The operation of the smoothing unit 140 included in the image quality enhancing apparatus 100 according to an exemplary embodiment will now be described in detail.

A typical limitation arising in the image fusion process is that an unnatural border exists between different regions. In order to solve this limitation, a Gaussian smoothing scheme can be adopted. In general, the MCA camera generates an unnatural border and the unnatural border can be removed through a blending operation using the Gaussian smoothing. Another limitation is that high frequency components are restrained through the Gaussian smoothing in performing the fusion process. This limitation can be solved by a spatially adaptive noise smoothing scheme based on an alpha map.

Preferably, the registered images include a fine high frequency region and a restored smooth image has a flat region. A resultantly obtained image is obtained by adaptively mixing image which have been divided and low-pass-filtered as shown in Equation 7 below:

$$f_A = \alpha g + (1-\alpha) f_R, \text{ for } 0 \leq \alpha \leq 1 \qquad \text{Equation 7}$$

Here, g is an image restored by using soft-decision fusion and blending, $f_R$ is a segmented region, and $f_A$ is an adaptively mixed image. A weight factor α is obtained by Equation 8 shown below:

$$\alpha(x, y) = \frac{1}{1 + \beta\sigma^2(x, y)} \qquad \text{Equation 8}$$

Here, β is a tuning parameter for making α greater than or equal to 0 or smaller than or equal to 1, and $\sigma^2(x,y)$ is a local variance obtained by Equation 9 shown below:

$$\sigma^2(x, y) = \frac{1}{PQ}\sum_{(x,y)\in S}(f(x, y) - m_{xy})^2 \qquad \text{Equation 9}$$

Here, P and Q are vertical and horizontal sizes of the regions, respectively, S is a quadrangular region including (x,y), and $m_{xy}$ is a local average of the regions given as shown in Equation 10 below:

$$m_{xy} = \frac{1}{PQ}\sum_{(x,y)\in S} f(x, y) \qquad \text{Equation 10}$$

The weight factor α is distributed as uniformly as possible between [0, 1]. When the value of the alpha map is small, it indicates a fine high frequency region, and when the value of the alpha map is large, it indicates a smooth and flat region. The finally mixed image has a salient edge and reduced artifact.

Figure 8:
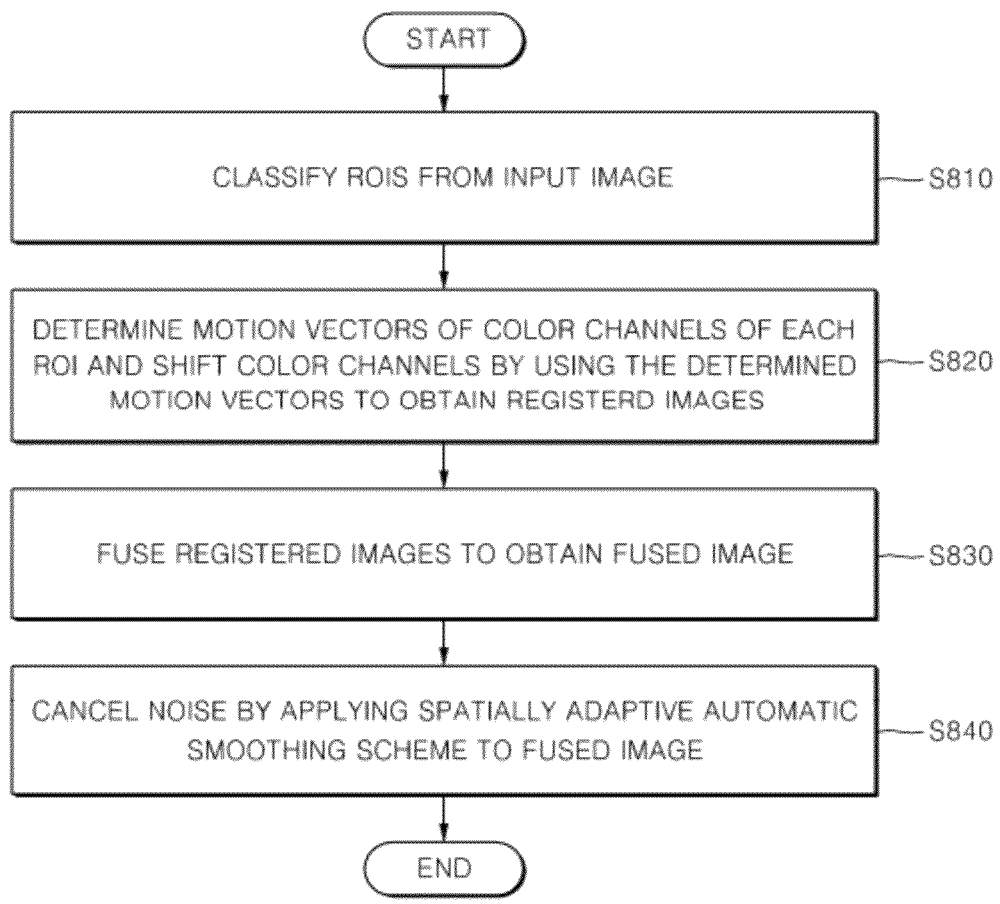
FIG. 8 is a flow chart illustrating the process of an image quality enhancing method according to an exemplary embodiment.

FIG. 8 is a flow chart illustrating the process of an image quality enhancing method according to an exemplary embodiment.

With reference to FIG. 8, the image quality enhancing method according to an exemplary embodiment includes (i) cluster-based ROI estimating process, (ii) PCM process, (iii) fusing process, and (iv) a spatially adaptive noise smoothing process based on the alpha map, in order to enhance image quality.

When an image is input, ROIs of the input image are classified according to the distance from an image capturing device by using the cluster-based image segmentation algorithm in operation S810. The image obtained by the MCA structure includes a color misalignment which provides additional depth information of objects located at different distances. Also, the color misalignment can provide additional information for blur estimation.

In this case, in order to classify the ROIs, salient regions corresponding to the objects are selected by applying the K-means clustering scheme and the hill-climbing scheme to the input image, the blocks corresponding to the selected salient regions among the blocks segmented by using the block partitioning scheme are labeled as ROIs as described above.

In particular, in order to select the salient regions, in the image quality enhancing method according to an exemplary embodiment, the color space of the input image is converted into a CIELab color space and a 3D CIELab histogram is generated. And then, the salient regions are classified by calculating K seeds to be used for the K-means clustering scheme from the generated histogram.

Also, in order to perform ROI labeling, first, a reference block including clusters is selected, and then, ROIs are determined In order to determine the ROIs, when adjacent blocks include the clusters of the reference block and pixels are connected between the adjacent blocks and the reference block, the adjacent blocks are integrated to a previous ROI as described above. The cluster-based image segmentation method can effectively classify the ROIs according to the distance from the camera. The segmented regions are aligned by using the PCM, and the aligned regions are fused to generate an in-focus image.

Namely, the high frequency component of the image data included in the ROIs are analyzed to determine motion vectors of color channels corresponding to the respective ROIs, and the color channels are shifted based on the determined motion vectors in operation S820. When the color channels are shifted, registered images are obtained.

Then, the registered images are fused to obtain a fused image in operation S830. In particular, in the image quality enhancing method according to an exemplary embodiment, the border between the ROIs existing in the fused image is smoothed to improve image quality of the fused image in operation S840. Namely, in order to further enhance the color-registered image, the spatially adaptive noise smoothing scheme based on the alpha map can be used as described above. The fact that image quality of the output image of the MCA camera can be remarkably enhanced by the image quality enhancing method according to an exemplary embodiment has been revealed, and it can be entirely or partially integrated to a multi-focusing or extended depth of field (EDoF) system having a form of a finite impulse response (FIR) structure.

Figure 9:
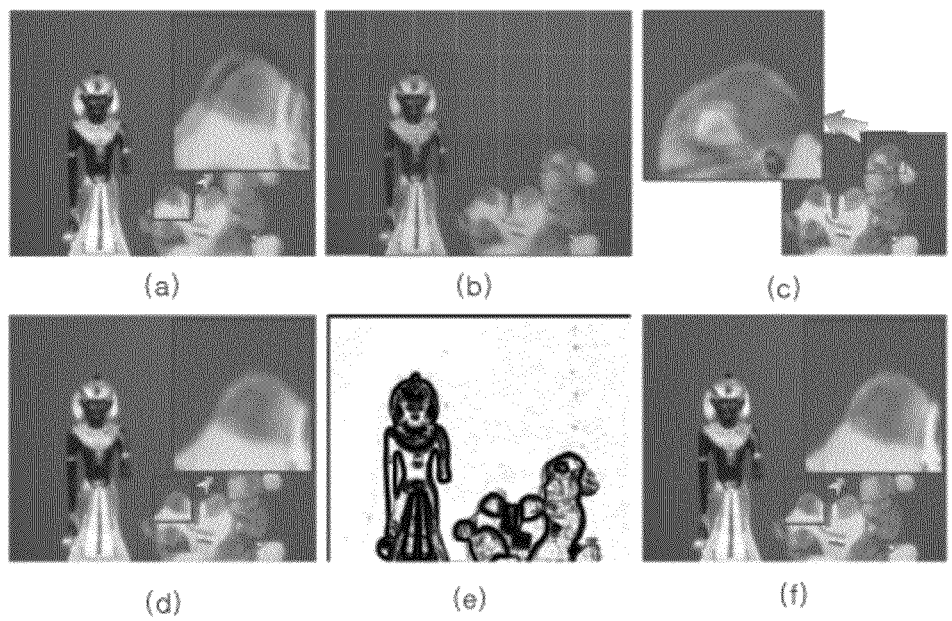
FIGS. 9 and 10 are views showing experimentation results obtained by using the image quality improving method according to an exemplary embodiment.
Figure 10:
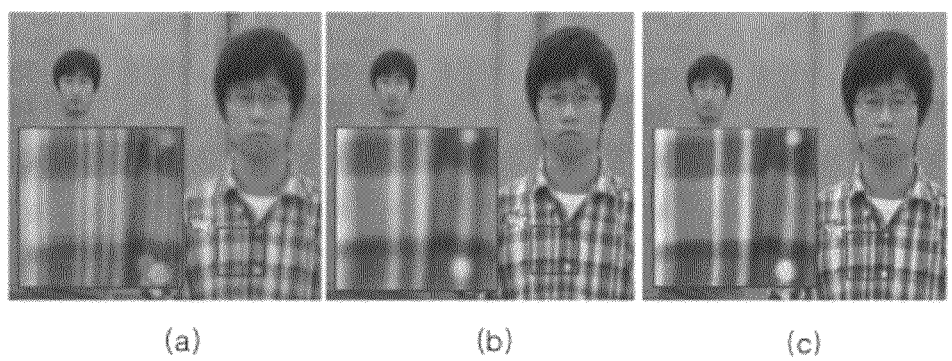

FIGS. 9 and 10 are views showing experimentation results obtained by using the image quality improving method according to an exemplary embodiment. Each test image includes several objects located at different distances from the MCA camera. An output image and an ROI estimation process are illustrated in (a) and (b) of FIG. 9, respectively. With reference to images illustrated in (c) and (d) of FIG. 9, it is noted that the color misalignment is corrected but the sharpness of the fused image is reduced. The results of the spatially adaptive noise smoothing filtering are illustrated in (f) of FIG. 9.

(a) to (c) of FIG. 10 show the results of the color channel registering operation, the registering and fusing operation, and the alpha map-based spatially adaptive noise smoothing filtering operation, respectively. As noted from the results illustrated in FIG. 10, the image quality enhancing apparatus according to an exemplary embodiment can significantly enhances the image quality of the image captured by the MCA camera.

As described above, the apparatus and method for enhancing image quality of an image according to an exemplary embodiment can enhance image quality of an image obtained by the MCA camera by using the cluster-based ROI estimation scheme, the image registration scheme using the PCM and fusion, and the alpha map-based spatially adaptive noise smoothing filtering scheme. The cluster-based image segmentation method used in the exemplary embodiment can automatically classify ROI regions with a very high level of precision. Also, the alpha map-based spatially adaptive noise smoothing filter can successfully emphasize the high frequency component of the border between objects with a very small calculation overhead. The illustrated experimental examples show that the technique according to an exemplary embodiment favorably operates for an image having several out-of-focus objects.

The present invention can be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Although the apparatus and method for enhancing image quality of an image captured by using MCA camera have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. An apparatus for enhancing image quality of an image, the apparatus comprising:
    a region of interest (ROI) classifying unit classifying ROIs according to distances from an image capturing device with respect to the entire area of an input image captured by the image capturing device having an aperture with a plurality of openings employing different color filters by using a cluster-based image segmentation algorithm, the ROI classifying unit comprising:
        a salient region selecting unit selecting a salient region corresponding to an object by applying a K-means clustering scheme and a hill-climbing scheme to the input image; and
        an ROI labeling unit labeling blocks corresponding to the selected salient region among blocks segmented by using a block partitioning scheme, as ROIs;
    a color channel registering unit determining motion vectors of color channels corresponding to the respective ROIs by analyzing a high frequency component of image data included in the ROIs, and moving the color channels based on the determined motion vectors to obtain a registered image of the respective ROIs;
    an image fusing unit fusing the registered images of the respective ROIs to obtain a fused image; and
    a smoothing unit smoothing the border between the ROIs existing in the fused image to enhance image quality of the fused image.

2. The apparatus of claim 1, wherein the salient region selecting unit converts a color space of the input image into a CIELab color space, generates a 3D CIELab histogram, searches peaks with respect to every bin of the CIELab histogram by using the hill-climbing scheme, and classifies the salient region by using the K-means clustering scheme using K seeds based on the peaks, and the ROI labeling unit selects a reference block including clusters, and performs an operation of integrating adjacent blocks to a previous ROI when pixels are connected between the adjacent blocks including the clusters of the reference block and the reference block.

3. The apparatus of claim 1, wherein the color channel registering unit sets one of the color channels as a reference channel, determines the motion vectors of the color channels with respect to the reference channel by using Equation A shown below, moves the color channels toward the reference channel according to the determined motion vectors and aligns them, moves the color channels toward the reference channel according to the determined motion vectors to align the color channels, and performs a center compensation operation of moving the color channels toward the center of gravity based on the reference channel and the position relationship of the aperture, $$r_d(x,y) = \delta(x-\Delta x, y-\Delta y) \quad \text{Equation A}$$

wherein $r_d$ is an inverse discrete Fourier transform (IDFT) of Rd as a cross-power spectrum, $(\Delta x, \Delta y)$ are displacements of x and Y directions, respectively, F is a DCT of f indicating a certain color channel, and $F_i^*$ is a complex conjugate of $F_i (i \in \{R,G,B\})$.

4. The apparatus of claim 1, wherein the smoothing unit obtains a restored image and a segmented region from the fused image by using a soft-decision fusion and blending scheme, and then obtains an adaptively mixed image from the restored image and the segmented region through Equation B to Equation E shown below:

$$f_A = \alpha g + (1-\alpha) f_R, \quad \text{for } 0 \leq \alpha \leq 1 \quad \text{Equation B}$$

$$\alpha(x, y) = \frac{1}{1 + \beta \sigma^2(x, y)} \quad \text{Equation C}$$

$$\sigma^2(x, y) = \frac{1}{PQ} \sum_{(x,y) \in S} (f(x, y) - m_{xy})^2 \quad \text{Equation D}$$

$$m_{xy} = \frac{1}{PQ} \sum_{(x,y) \in S} f(x, y) \quad \text{Equation E}$$

wherein g is the restored image, $f_R$ is the segmented region, $f_A$ is the adaptively mixed image, $\alpha$ in Equation B is a weight factor calculated by Equation C, $\beta$ in Equation C is a tuning parameter for making $\alpha$ greater than or equal to 0 or smaller than or equal to 1, $\sigma^2(x,y)$ is a local variance calculated by Equation D, P and Q are vertical and horizontal sizes of the regions, respectively, S is a quadrangular region including (x,y), and $m_{xy}$ is a local average of regions.

5. The apparatus of claim 1, wherein the aperture comprises three openings employing red, blue, and green color filters, and the respective color channels are generated as incident light passes through the color filters.

6. A method for enhancing image quality of an image, the method comprising:
    a region of interest (ROI) classifying operation of classifying ROIs according to distances from an image capturing device in an input image captured by the image capturing device having an aperture with a plurality of openings employing different color filters by using a cluster-based image segmentation algorithm, the ROI classifying operation comprising:
        a salient region selecting operation of selecting a salient region corresponding to an object by applying a K-means clustering scheme and a hill-climbing scheme to the input image; and
        an ROI labeling operation of labeling blocks corresponding to the selected salient region among blocks segmented by using a block partitioning scheme, as ROIs;
    a color channel registering operation of determining motion vectors of color channels corresponding to the respective ROIs by analyzing a high frequency component of image data included in the ROIs, and moving the color channels based on the determined motion vectors to obtain a registered image of the respective ROIs;
    an image fusing operation of fusing the registered images of the respective ROIs to obtain a fused image; and a smoothing operation of smoothing the border between the ROIs existing in the fused image to enhance image quality of the fused image.

7. The method of claim 6, wherein the salient region selecting operation comprises:
converting a color space of the input image into a CIELab color space and generating a 3D CIELab histogram;
searching peaks with respect to every bin of the CIELab histogram by using the hill-climbing scheme; and
classifying the salient region by using the K-means clustering scheme using K seeds based on the peaks; and
the ROI labeling operation comprises:
selecting a reference block comprising clusters; and
performing an operation of integrating adjacent blocks to a previous ROI when the adjacent blocks comprises the clusters of the reference block and pixels are connected between the adjacent blocks and the reference block.

8. The method of claim 6, wherein the color channel registering operation comprises:
setting one of the color channels as a reference channel;
determining the motion vectors of the color channels with respect to the reference channel by using Equation A shown below;
moving the color channels toward the reference channel according to the determined motion vectors and aligning them; and
a center compensation operation of moving the color channels toward the center of gravity in consideration of the reference channel and the position relationship of the aperture, $$r_d(x,y) = \delta(x-\Delta x, y-\Delta y) \quad \text{Equation A}$$

wherein $r_d$ is an inverse discrete Fourier transform (IDFT) of Rd as a cross-power spectrum, $(\Delta x, \Delta y)$ are displacements of x and Y directions, respectively, F is a DCT of f indicating a certain color channel, and $F^{i*}$ is a complex conjugate of $F_i (i \in \{R,G,B\})$.

9. The method of claim 6, wherein the smoothing operation comprises:
obtaining a restored image and a segmented region from the fused image by using a soft-decision fusion and blending scheme; and
obtaining an adaptively mixed image from the restored image and the segmented region through Equation B to Equation E shown below:

$$f_A = \alpha g + (1-\alpha)f_R, \quad \text{for } 0 \le \alpha \le 1 \quad \text{Equation B}$$

$$\alpha(x, y) = \frac{1}{1 + \beta \sigma^2(x, y)} \quad \text{Equation C}$$

$$\sigma^2(x, y) = \frac{1}{PQ} \sum_{(x,y) \in S} (f(x, y) - m_{xy})^2 \quad \text{Equation D}$$

$$m_{xy} = \frac{1}{PQ} \sum_{(x,y) \in S} f(x, y) \quad \text{Equation E}$$

wherein g is the restored image, $f_R$ is the segmented region, $f_A$ is the adaptively mixed image, $\alpha$ in Equation B is a weight factor calculated by Equation C, $\beta$ in Equation C is a tuning parameter for making $\alpha$ greater than or equal to 0 or smaller than or equal to 1, $\sigma^2(x,y)$ is a local variance calculated by Equation D, P and Q are vertical and horizontal sizes of the regions, S is a quadrangular region including (x,y), and $m_{xy}$ is a local average of regions.

10. The method of claim 6, wherein the aperture comprises three openings employing red, blue, and green color filters, and the respective color channels are generated as incident light passes through the color filters.

11. A computer-readable medium containing program instructions for enhancing image quality of an image, wherein execution of the program instructions by one or more processors of a computer system causes the one or more processors to carry out the acts of:
a region of interest (ROI) classifying operation of classifying ROIs according to distances from an image capturing device in an input image captured by the image capturing device having an aperture with a plurality of openings employing different color filters by using a cluster-based image segmentation algorithm; the ROI classifying operation comprising:
a salient region selecting operation of selecting a salient region corresponding to an object by applying a K-means clustering scheme and a hill-climbing scheme to the input image; and
an ROI labeling operation of labeling blocks corresponding to the selected salient region among blocks segmented by using a block partitioning scheme, as ROIs;
a color channel registering operation of determining motion vectors of color channels corresponding to the respective ROIs by analyzing a high frequency component of image data included in the ROIs, and moving the color channels based on the determined motion vectors to obtain a registered image of the respective ROIs;
an image fusing operation of fusing the registered images of the respective ROIs to obtain a fused image; and
a smoothing operation of smoothing the border between the ROIs existing in the fused image to enhance image quality of the fused image.

* * * * *